(12) United States Patent
Bestic et al.

(10) Patent No.: US 10,442,621 B2
(45) Date of Patent: Oct. 15, 2019

(54) WAREHOUSE SYSTEM AND TRANSFER VEHICLE

(71) Applicant: Nelson Mandela Metropolitan University, Summerstrand (ZA)

(72) Inventors: Adriane Michele Bestic, Lovemore Heights (ZA); Ashley Mark Naude, Gonubie (ZA); Shuldham Shaun Peard, Summerstrand (ZA); Christopher John Sephton, South End (ZA)

(73) Assignee: Nelson Mandela Metropolitan University, Port Elizabeth (ZA)

( * ) Notice: Subject to any disclaimer, the term of this patent is extended or adjusted under 35 U.S.C. 154(b) by 0 days.

(21) Appl. No.: 15/520,589

(22) PCT Filed: Oct. 19, 2015

(86) PCT No.: PCT/IB2015/058031
§ 371 (c)(1),
(2) Date: Apr. 20, 2017

(87) PCT Pub. No.: WO2016/063197
PCT Pub. Date: Feb. 8, 2016

(65) Prior Publication Data
US 2017/0305668 A1    Oct. 26, 2017

(30) Foreign Application Priority Data
Oct. 20, 2014    (ZA) ................................ 2014/07541

(51) Int. Cl.
*B65G 1/04*        (2006.01)
*B65D 25/22*       (2006.01)
(Continued)

(52) U.S. Cl.
CPC .......... *B65G 1/0471* (2013.01); *B65D 25/22* (2013.01); *B65D 51/16* (2013.01);
(Continued)

(58) Field of Classification Search
CPC ........................... B65G 1/0464; B65G 1/0471
See application file for complete search history.

(56) References Cited

U.S. PATENT DOCUMENTS 4,690,601 A * 9/1987 Delius ...................... B65G 1/02
                                                    211/128.1
8,721,251 B1 * 5/2014 Razumov ............. B65G 1/0407
                                                    108/144.11
(Continued)

FOREIGN PATENT DOCUMENTS

DE    102009017241         10/2010
DE    102009017241 A1 * 10/2010 ........... B65G 1/0464
(Continued)

OTHER PUBLICATIONS

"International Application No. PCT/IB2015/058031, International Search Report and Written Opinion dated Feb. 1, 2016", (Feb. 1, 2016), 15 pgs.

(Continued)

*Primary Examiner* — Thomas Randazzo
(74) *Attorney, Agent, or Firm* — Schwegman Lundberg & Woessner, P.A.

(57) ABSTRACT

A racking system and components are provided in which multiple storage positions are provided for individual storage boxes and automated guided vehicles are present to carry out automated placement, relocation and retrieval of boxes from storage positions in which they are located. The racking system has horizontally extending storage layers in each of which multiple storage positions are located and alternating vertically juxtaposed transfer layers in which (Continued)

automated guided vehicles are movable in at least two directions that are at right angles to each other to place, relocate and retrieve boxes to and from storage positions by vertical movement of the boxes into and out of storage positions in storage layers located above or below a transfer layer. The storage positions have associated with them storage guides for guiding boxes into and out of the storage positions and support arrangements for supporting the boxes in their storage positions.

15 Claims, 12 Drawing Sheets

(51) Int. Cl.
    *B65D 81/20*     (2006.01)
    *B65G 1/06*     (2006.01)
    *G05D 1/02*     (2006.01)
    *B65D 51/16*     (2006.01)

(52) U.S. Cl.
    CPC ....... *B65D 81/2015* (2013.01); *B65G 1/0464* (2013.01); *B65G 1/065* (2013.01); *G05D 1/0297* (2013.01); *G05D 2201/0216* (2013.01)

(56) References Cited

U.S. PATENT DOCUMENTS

| | | | |
|---|---|---|---|
| 2009/0265031 | A1 | 10/2009 | Tachibana et al. |
| 2015/0225187 | A1* | 8/2015 | Razumov ............. B65G 1/0471 414/279 |
| 2016/0016731 | A1* | 1/2016 | Razumov ............. B65G 1/0492 414/279 |
| 2016/0060037 | A1* | 3/2016 | Razumov ............. B65G 1/1378 700/216 |

FOREIGN PATENT DOCUMENTS

| | | |
|---|---|---|
| WO | WO-2013167907 | 11/2013 |
| WO | WO-2014090684 | 6/2014 |
| WO | WO-2016063197 | 4/2016 |

OTHER PUBLICATIONS

"International Application No. PCT/IB2015/058031, Notification Concerning the Filing of Amendments of the Claims under Article 19 dated Apr. 7, 2016", (Apr. 7, 2016), 6 pgs.

* cited by examiner

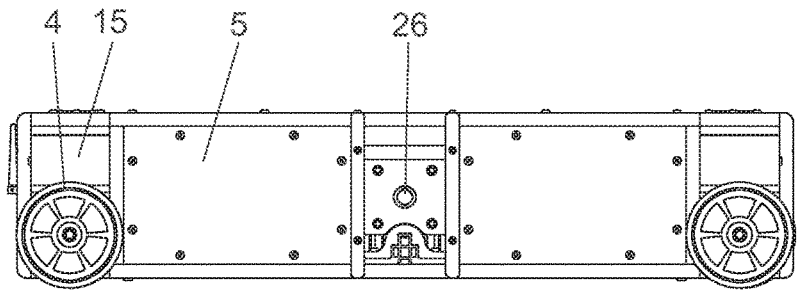
Figure 7
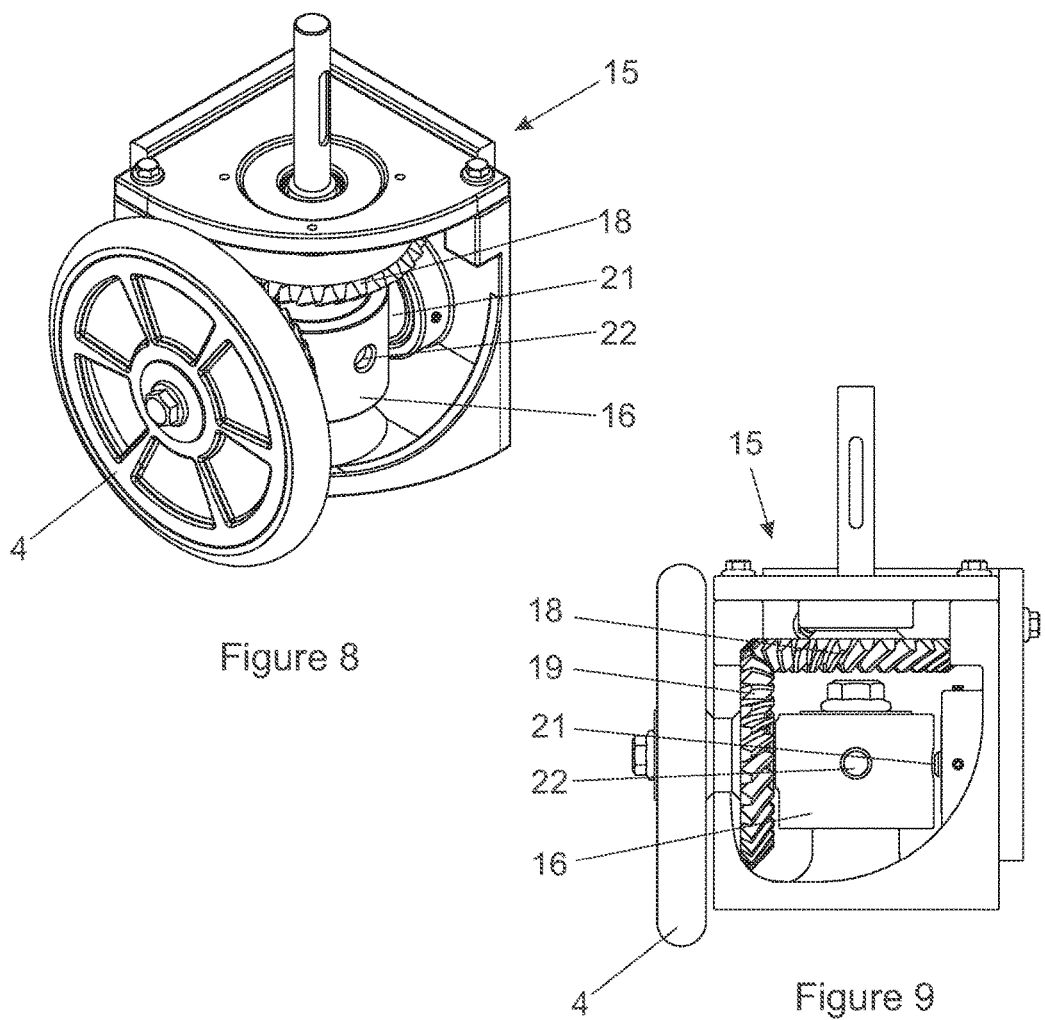
Figure 8
Figure 9

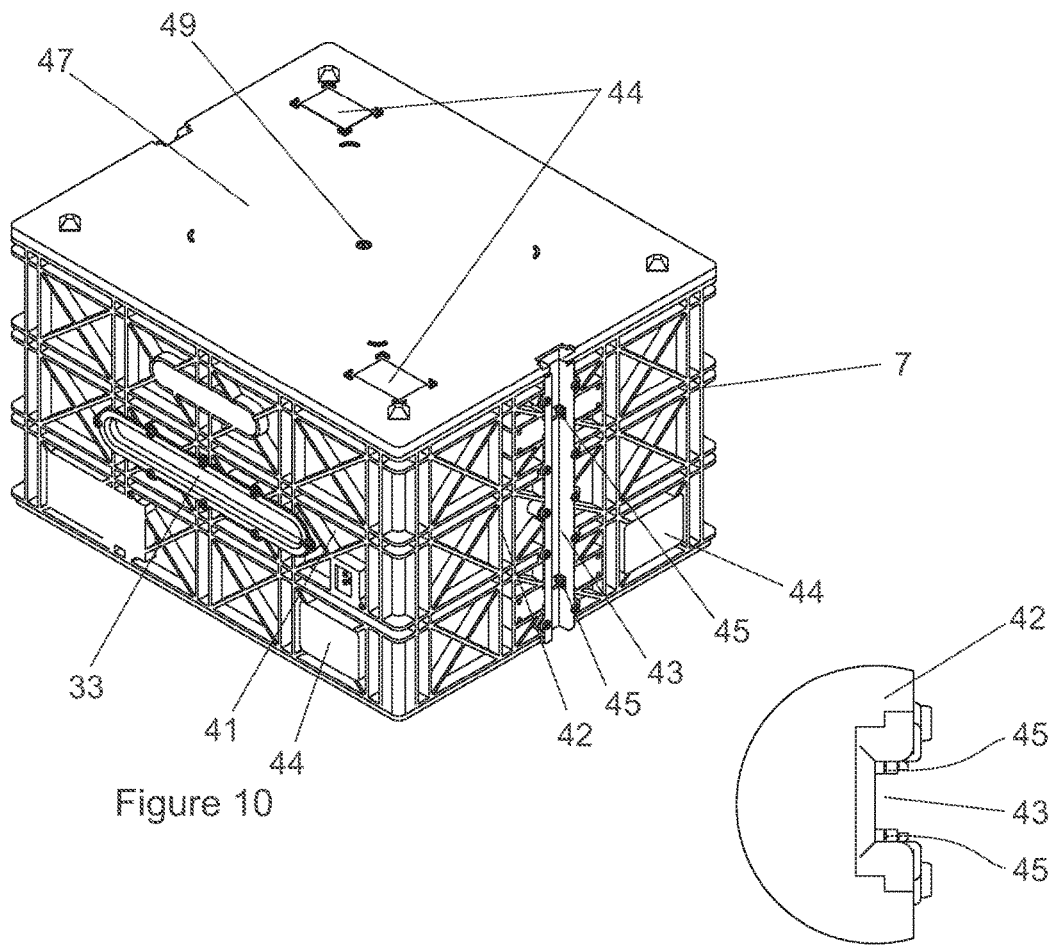
Figure 10
Figure 11
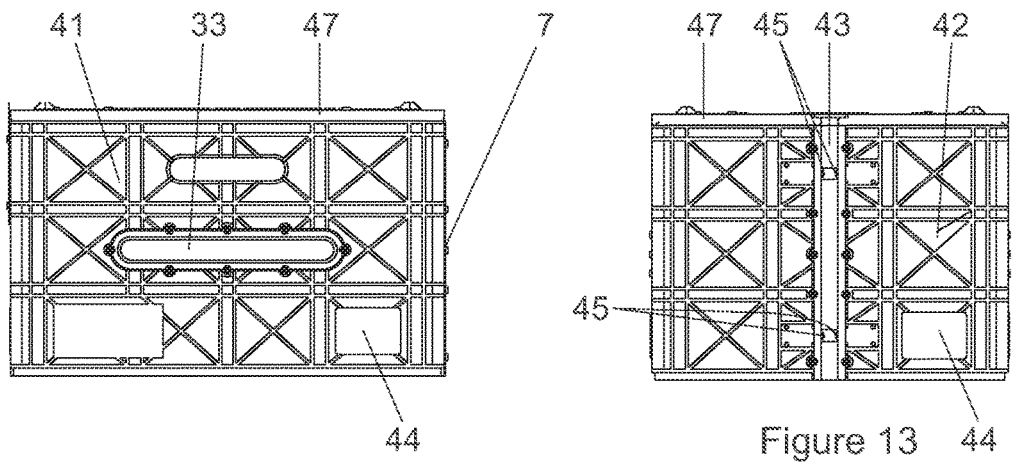
Figure 12
Figure 13

WAREHOUSE SYSTEM AND TRANSFER VEHICLE

CROSS-REFERENCE(S) TO RELATED APPLICATIONS

This application is a U.S. national stage application filed under 35 U.S.C. § 371 from International Application Serial No. PCT/IB2015/058031, which was filed 19 Oct. 2015, and published as WO2016/063197 on 28 Apr. 2016, and which claims priority to South African provisional patent application number 2014/07541 filed 20 Oct. 2014, which applications and publication are incorporated by reference as if reproduced herein and made a part hereof in their entirety, and the benefit of priority of each of which is claimed herein.

FIELD OF THE INVENTION

This invention relates to a warehouse system and automated guided vehicle that handle the placement, sorting and retrieval of packages within an automated storage system. Such storage systems are the heart of any logistics hub or operation in which packages are received, temporarily stored, and dispatched to a recipient.

The invention is applicable to any desired duration of storage including warehouse systems in which temporary storage of packages takes place for periods of time between a few minutes and say 24 hours as well as for substantially longer periods of time of the order of days, weeks or even months.

Whilst a storage system according to the invention may be supported by a network of conveyors and peripheral package handling devices, the warehouse system is intended to deal specifically with the placement, reorganisation, prioritization, movement and retrieval of packages within a racking installation.

It is to be noted that the term package in this specification is used in a broad sense and should be interpreted as including numerous different types of items including items of commerce, for example items purchased over the Internet, important letters, valuable documents, goods, parts, assembled components and any other items that are capable of being packaged in a transportable manner and conforming to size and weight limitations of the relevant system.

BACKGROUND TO THE INVENTION

The ecommerce and courier revolution requires that a warehouse system that receives, stores, and despatches packages operates as efficiently as possible in order to satisfy customer expectations. A few additional and unnecessary minutes in a warehouse system could make the difference between commencing a journey today or tomorrow and the consequence of the latter could be the difference between a satisfied customer and a dissatisfied customer.

Furthermore, a delayed arrival of a purchase often equates to a lost future sale in view of the wide range of suppliers generally available to a customer carrying out e-purchases, for example over the Internet.

A modern day sorting and distribution centre may be required to handle well in excess of 100,000 packages per hour. An automated warehouse for sorting and despatching packages is a highly complex infrastructure as it needs to automatically combine packages for co-destination shipment and that complicates the sorting operation substantially. Packages are, for storage purposes, located in open topped boxes that can easily be handled by automated guided vehicles that do automated placement and retrieval in a storage racking system.

In a modern courier and e-commerce distribution centre, the time scale is rather short and the applicant has worked on the basis that ultra-short term storage would be up to about 10 minutes; short term storage would be from about 10 to about 30 minutes; medium term storage would be from about 30 to about 60 minutes; and longer term storage would be from about 1 hour to about 24 hours. In courier facilities, any longer term storages may optionally be routed to a different zone or warehouse system that may be attached to, or form part of, the same greater storage facility.

In e-commerce fulfillment centres, factory parts stores and retail distribution warehouses, the system may be used to store items for a substantially longer period of time, ranging from days to weeks and even months in the case of infrequently purchased items.

Whilst sorting and optimization algorithms are limited only by the clock speed of the super computers on which they run, implementing the physical movement of the packages requires complex mechanisms and storage solutions. Current linear storage solutions do not permit dynamic reorganisation and tracking of packages. An automated storage and retrieval system operating only in vertical rows and consequently only able to manoeuvre in a single horizontal direction whilst operating in said rows, does not allow for packages to be simultaneously placed and/or retrieved and/or rearranged. Existing automated guided vehicles that place and retrieve packages from a storage racking system are only able to move on a single track on a particular level and can only be moved between levels by lifts at the ends of the tracks. Thus, two automated guided vehicles are unable to operate at the same level in the same row at the same time as they are unable to overtake or pass one another.

A commercially available system of this general nature is that produced by VANDERLANDE INDUSTRIES of the Netherlands.

United States published patent application no US20090265031 describes an example of that general type of warehouse system too.

An aim of the present invention is to improve economies of scale by overcoming, at least to some extent, limitations of existing systems that are known to the applicant and to enable or enhance the speed of amalgamation of the shipment of online sales with point-to-point courier services, as may be required.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

In this specification the term "box" or its plural "boxes" is intended to mean any container with or without a lid and includes what are commonly referred to as crates and other open or closed storage containers.

SUMMARY OF THE INVENTION

In accordance with a first aspect of this invention there is provided a racking system in which multiple storage positions are provided for individual storage boxes and automated guided vehicles are present to carry out automated placement, relocation and retrieval of boxes from storage positions in which they are located, the racking system being arranged in horizontally extending layers made up of alternating storage layers in which said multiple storage positions are located and vertically juxtaposed transfer layers in which automated guided vehicles are movable in at least two directions that are at right angles to each other to place relocate and retrieve boxes to and from storage positions in which they are located in the storage layers by vertical movement of the boxes into and out of storage positions above or below the transfer layer in which a storage box is located, and wherein the storage positions have associated with them storage guides for guiding boxes into and out of the storage positions and support arrangements for supporting the boxes in their storage positions.

Further features of the first aspect of the invention provide for the storage guides to be vertical rails arranged to align with vertical rails provided on automated guided vehicles temporarily so that a box can be guided for movement between an automated guided vehicle and a storage position by moving a box along temporarily aligned rails; for the transfer layers to have associated with them support beams that define distinct tracks along which the automated guided vehicles are movable; for the support beams to project outwards on each side of vertical supports for the racking system so that automated guided vehicles can pass both the vertical supports and each other on different tracks; for the tracks to be defined by guide grooves or rails in the beams for cooperating with the periphery of the wheels of an automated guided vehicle; and for the tracks, in appropriate circumstances, to have arcuate connecting grooves or rails for enabling a wheel of an automated guided vehicle to rotate about a vertical axis through 90° so as to move from one guide groove or rail to a guide groove or rail extending at right angles to it as it changes from one terminal position to the other terminal position.

In accordance with a second aspect of the invention there is provided an automated guided vehicle for use in association with a co-operating racking system and having a drive arrangement for a support wheel assembly that enables the automated guided vehicle to travel selectively in at least two directions at right angles to each other and parallel to sides of the automated guided vehicle, the automated guided vehicle being of a generally square outer peripheral shape in plan view and having a box receiving aperture in a central region thereof for receiving at least one storage box to be transported by the automated guided vehicle; supports for at least intermittently supporting at least one storage box located within the box receiving aperture, guides for guiding a box into and out of the box receiving aperture in a vertical direction, a lifting device associated with the automated guided vehicle for moving a box vertically into and out of the box receiving aperture by a distance in excess of a height of the box, and a controller for controlling movement of the automated guided vehicle in a horizontal plane and for controlling operation of the lifting device.

Further features of the invention provide for the automated guided vehicle to have a transmitter and receiver to provide for two way communication between the automated guided vehicle and a centralized control computer for controlling multiple automated guided vehicles and for transmitting and receiving locational data of automated guided vehicles and boxes; for the box receiving aperture to be dimensioned to receive a possible two juxtaposed boxes and more preferably a possible four juxtaposed boxes each of generally rectangular shape in plan view; and for the automated guided vehicle to be fitted with one part of a contactless wireless energy transfer system the other part of which is to be associated with a co-operating racking system or, alternatively, for the automated guided vehicle to be powered by batteries, ultra-capacitors or other energy storage arrangement with any necessary co-operant charging docks or energy transfer points being arranged on a co-operating racking system.

In one variation of the invention the lifting device comprises parallel arms rotatable in unison about one of their ends and having at the other ends retractable journals for cooperating with horizontal lifting channels in the sides of the boxes wherein the parallel arms are arranged to be located along the sides of adjacent boxes, in use. The lifting device is configured to move boxes vertically in relation to storage positions both below and above the automated guided vehicle and the supports may be vertical rails fixed to the automated guided vehicle and serving also as guides for confining boxes to substantially vertical movement relative to the automated guided vehicle, the vertical rails preferably having formations for cooperation with co-operant formations on a box.

In another variation of the invention that is especially suitable for lifting and lowering of boxes between vertically aligned automated guided vehicles at different transfer levels in a racking system, the lifting device comprises sets of opposite and inwardly directed wheels with or without belts on each side of each box receiving aperture of the automated guided vehicle such that the wheels or belts face inwards towards the box receiving aperture. The wheel sets or belts extend upwards or downwards in order to grip the sides or corners of a box by way of cooperative vertical guides in the sides of the box such that, when driven, they raise or lower a associated box from the box storage location in a storage level of the racking system and raise or lower the box in a vertical motion, optionally to an aligned upper or lower automated guided vehicle in succession until a required storage or discharge level is reached, whereat the last receiving automated guided vehicle places the box in the designated storage location in the racking system or a discharge conveyor or vehicle. The wheels or belts may have a tapered shape in cross-section so that a wedging action is achieved when the wheel or belt is urged into a co-operating vertical V-shaped groove in a side or end wall of a box. Other forms of inter-engagement between a wheel or belt and a side or bottom wall of a box are also possible.

Still further features of the invention provide for the support wheel assembly to include four wheels generally at the corners of the square automated guided vehicle and wherein each wheel is rotatable about its own horizontal axis between two terminal positions and is mounted on a cuff that is rotatable about a vertical axis with a drive assembly that includes a motor that can selectively drive the cuff from one terminal position through 90° to a second terminal position so that the automated guided vehicle can travel in a direction at right angles to the corresponding first terminal position without changing its orientation; for the drive assembly to include cooperating beveled gears connected to a motor drive so as to be capable of driving the wheel cuff between its two terminal positions when a releasable lock or brake is disengaged and of driving the wheel itself when the releasable lock or brake is engaged; and for the releasable lock or brake to be a solenoid operated element that is engaged in the locked position with respect to a co-operating formation, typically in the cuff.

As an alternative to that arrangement, it is possible to use two sets of four wheels with each wheel of each set having its axis of rotation at right angles (in the horizontal plane) to the axis of rotation of a corresponding wheel in the other set and wherein the automated guided vehicle is supported by either one set or the other set according to the direction in which automated guided vehicle is to be moved in any manner that is known in the art, or any other manner.

In accordance with a third aspect of the invention there is provided a box having two sides and two ends wherein outer faces of two opposite sides or two opposite ends have either horizontal lifting channels formed therein for engagement by retractable journals carried by lifting arms of an automated guided vehicle as defined as the one variation of the invention above with the lifting channels optionally being reinforced with steel or other durable material, or vertical surfaces or formations such as vertical flat surfaces or truncated V-shaped grooves for engagement by wheels or belts forming a lifting device in accordance with the other variation of the invention defined above.

Further features of the third aspect of the invention provide for the ends or sides of a box to have vertical locating grooves for receiving, in sliding relationship, vertical rails associated with an automated guided vehicle as defined above; for the vertical locating grooves to have latching mechanisms associated with them to interact with formations in the vertical rails to support a box in position on the automated guided vehicle; for the box to be provided with a lid having a seal for sealingly engaging the periphery of an open topped box wherein the lid preferably has a valve arrangement for enabling the interior of the box to be evacuated, at least to some extent, to enhance sealing of the lid to the box; and for the valve arrangement to be configured so that it opens only at predetermined degrees of the vacuum applied to it so that the lid can be handled by an automatic suction cup that can also be used to evacuate the interior of the box consequent on varying the suction pressure.

The invention may thus consist of three integrated aspects all of which together allow for dynamic placement, reorganisation and picking of unique packages while continuously keeping track, through a central supervisor control system and database, of the status and unique three dimensional address (x,y,z co-ordinates) of packages within a modular and multi-leveled racking structure.

Implementation of the invention does not therefore require a shelf or floor to support boxes which contain packages or goods. The boxes can be moved vertically by one or more automated guided vehicles from one storage level to another without relying on peripheral lifting support infrastructure. This capability avoids or decreases bottlenecks and constraints associated with warehouse infrastructures.

While the present application describes examples of each of the three aspects of the invention that could in some instances be used independently of each other, the co-functioning of the three aspects relative to each other is an very important aspect of a most significant implementation of the invention. The specific mechanisms, mechanical elements, electrical components, energy sources and dimensional details may vary to improve the efficiency, cost and ease of manufacture that supports combinations of two or three aspects of the invention.

In order that the above and other features of the invention may be more fully understood various embodiments of the various aspects of the invention will now be described with reference to the accompanying drawings.

BRIEF DESCRIPTION OF THE DRAWINGS

In the drawings:—

FIG. 7 is an elevation of the automated guided vehicle illustrated in FIG. 4 from a direction at 90° to that of FIG. 6;

FIG. 8 is an isometric view of a the lower part of a wheel unit of the automated guided vehicle illustrated in FIG. 4;

FIG. 9 is an elevation of the lower part of the wheel unit illustrated in FIG. 8;

FIG. 10 is an isometric view of one embodiment of box and lid assembly according to the invention;

FIG. 11 is a detailed plan view of a locating groove in one end of the box illustrated in FIG. 10;

FIG. 12 is a side view of the box illustrated in FIG. 10;

FIG. 13 is an end view of the box illustrated in FIG. 10;

DETAILED DESCRIPTION WITH REFERENCE TO THE DRAWINGS

Figure 1:
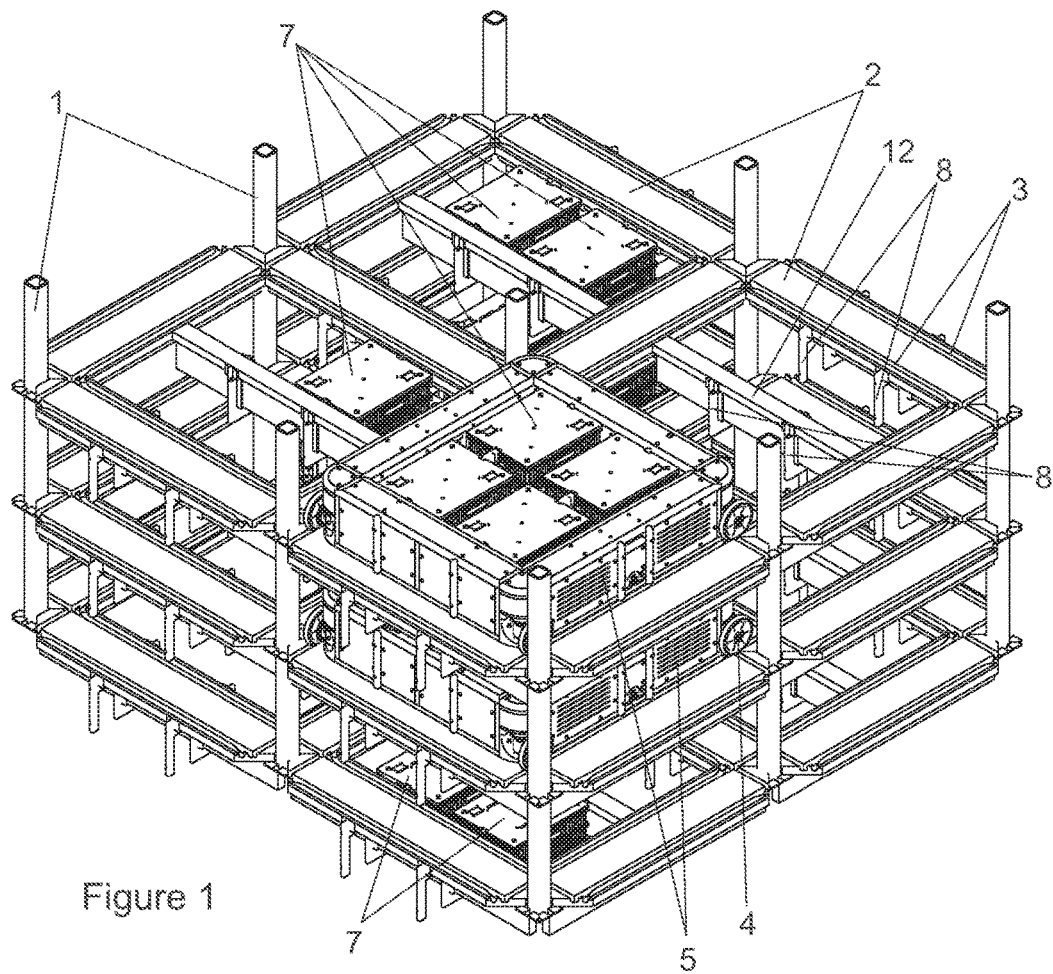
FIG. 1 is an isometric view of a modular unit of a racking system according to the invention showing two automated guided vehicles in position thereon.
Figure 2:
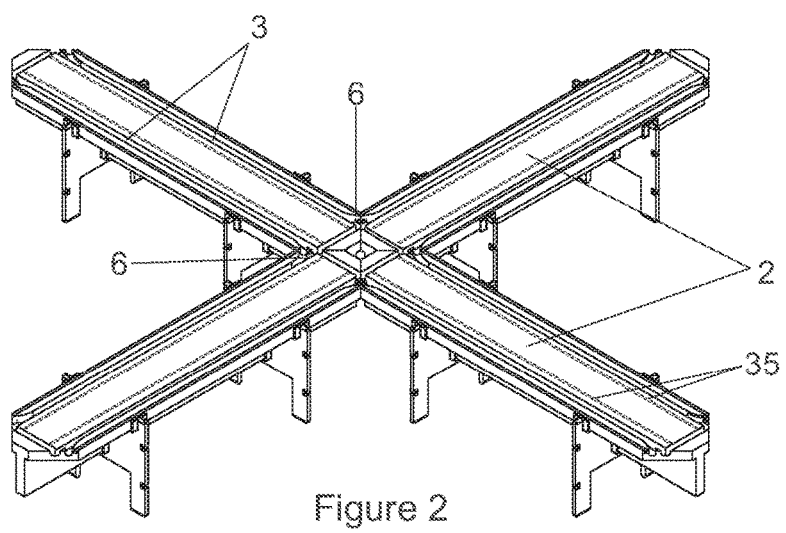
FIG. 2 is an isometric view showing one intersection between two lines of beams of the racking system illustrated in FIG. 1 crossing at right angles to each other.
Figure 3:
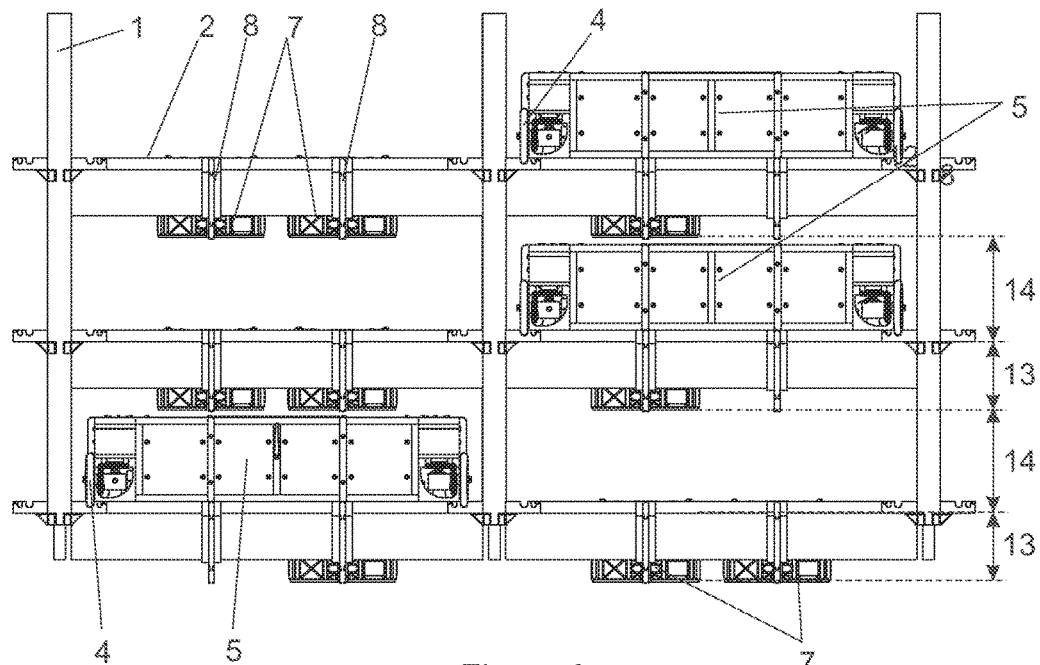
FIG. 3 is an elevation showing part of a modular unit of a racking system illustrated in FIG. 1.
Figure 4:
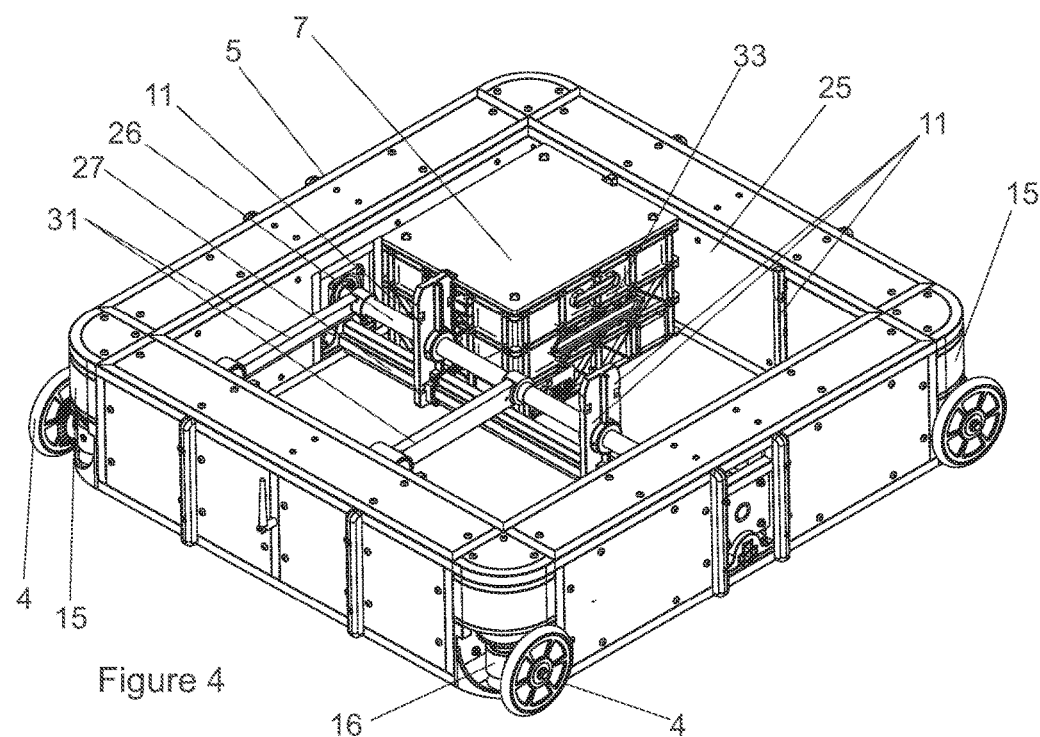
FIG. 4 is an isometric view of one embodiment of automated guided vehicle according to the invention showing one of four possible boxes in position therein.
Figure 5:
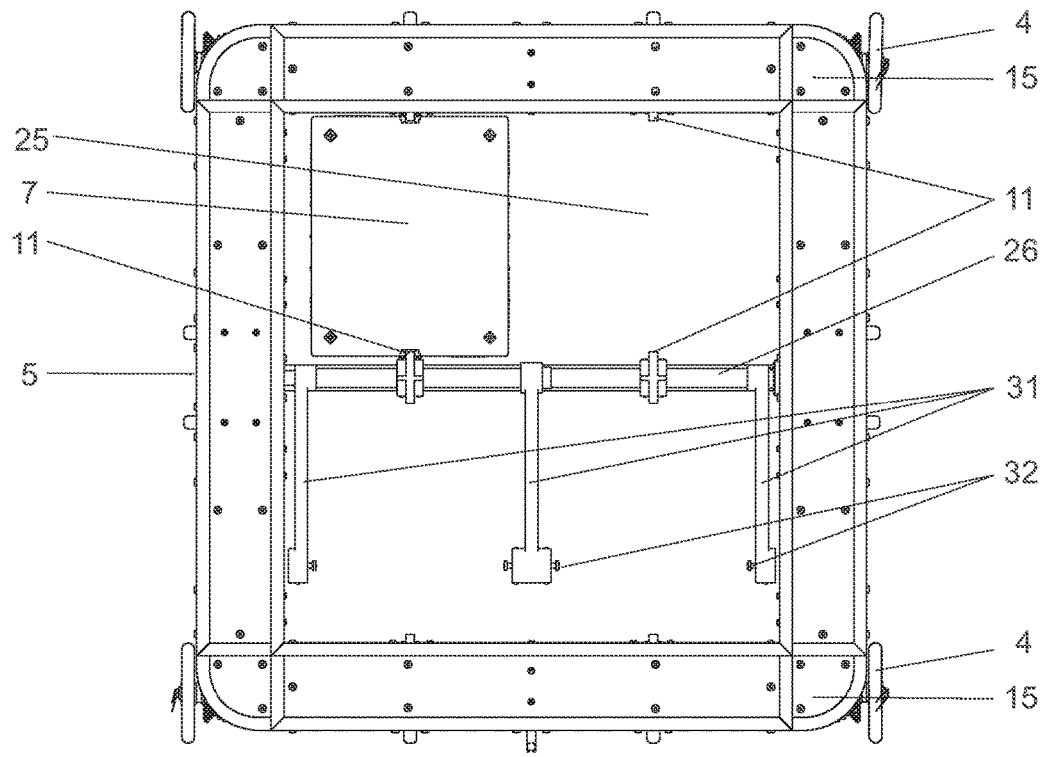
FIG. 5 is a plan view of the automated guided vehicle illustrated in FIG. 4.
Figure 6:
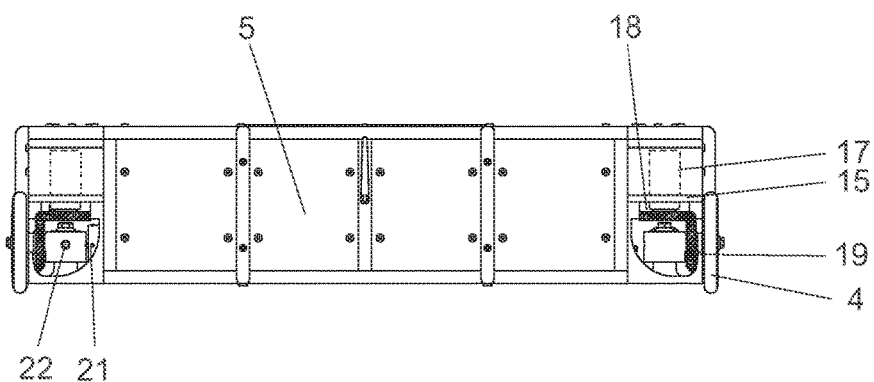
FIG. 6 is an elevation of the automated guided vehicle illustrated in FIG. 4 from one direction.

In the embodiment of the invention illustrated in the drawings, and initially with particular reference to FIGS. 1 to 3, a racking system comprises multiple vertical supports (1) arranged on a grid pattern and supporting multiple horizontal support beams (2) extending between them on the grid pattern. The beams are configured such that the width thereof projects outwards beyond the dimensions of the vertical supports in plan view so that a track that is in this instance defined by a guide groove (3) in the top surface of the beam may be provided towards the longitudinal side edges thereof. The guide grooves are shaped for cooperation with the periphery of wheels (4) of automated guided vehicles (5) for the racking system.

The arrangement is such that automated guided vehicles can move in two directions at right angles to each other and can pass both the vertical supports and each other on different juxtaposed tracks. At the intersections of support beams, arcuate connecting grooves (6) are provided for enabling a wheel of an automated guided vehicle to rotate about a vertical axis through 90° so as to move the wheel from one guide groove to a guide groove crossing it at right angles, as will become more apparent from what follows.

The support beams are arranged to define storage volumes that are square in plan view and form parts of storage layers immediately below the beams with each of the square storage volumes providing, in this particular instance, four possible storage positions for up to four individual storage boxes (7). The arrangement in this embodiment of the invention is such that each storage volume corresponds to the maximum load that an automated guided vehicle can accommodate. Each storage position within a storage volume is characterized by two opposite downwardly extending storage guides in the form of vertical storage rails (8) arranged such that vertical transfer rails (11) provided on automated guided vehicles may be aligned with them as required. When the rails are in alignment, a storage box (7) can be guided for vertical movement in either direction between an automated guided vehicle and a storage position by moving a box along the temporarily aligned rails.

Figure 19:
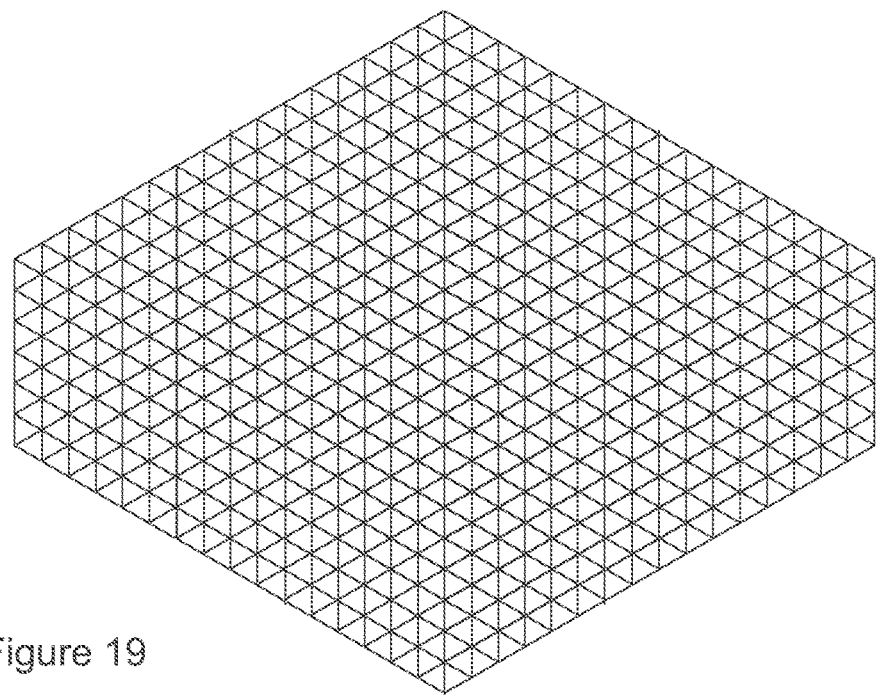
FIG. 19 is a schematic isometric view to illustrating multiple modules of the type illustrated in FIG. 1 forming a substantial infrastructure.

The four storage positions are positioned two on each side of an intermediate dividing beam (12) that has two of the vertical storage rails on each side thereof so that four boxes can be stored as two pairs thereof, one pair on each side of the dividing beam. In this manner a horizontal storage layer as indicated by numeral (13) in FIG. 3 is formed over an entire assembly such as is indicated in FIG. 19.

Immediately above each assembly of support beams, and therefore above each storage layer, is a transfer layer that is indicated by numeral (14) in FIG. 3, in which automated guided vehicles (5) may move in each of two directions that are at right angles to each other. Movement is controlled so that the automated guided vehicles can place and retrieve boxes by vertical movement of the boxes to and from storage positions in the storage layers either immediately above or immediately below the relevant transfer layer. The racking system is thus arranged in horizontally extending layers made up of storage layers in which said multiple storage positions are located and vertically juxtaposed transfer layers in which automated guided vehicles are movable.

Turning now to the automated guided vehicle (5) that is particularly well illustrated in FIGS. 4 to 9, the vehicle is of square outer peripheral shape and is provided with a support wheel assembly comprising a wheel unit (15) at each corner thereof. Each wheel unit has a drive assembly that enables the automated guided vehicle to travel selectively in either of two directions at right angles to each other and that are parallel to the sides of the automated guided vehicle. Each wheel (4) is rotatable about its own horizontal axis and is mounted on a cuff (16) that is rotatable through 90° about a vertical axis between one terminal position corresponding to travel in one of the directions and a second terminal position corresponding to travel in the other direction at right angles to the first direction.

The drive assembly includes a vertical axis servo motor (17) that drives a driving bevelled gear (18) that meshes with a driven bevelled gear (19) fixed to the relevant wheel (4) or its axle. The arrangement is such that when the cuff is locked in one terminal angular position by means of a retractable solenoid operated pin (21) engaged in a hole (22) in the cuff, the wheel is driven in the appropriate direction. On the other hand, when the pin (21) is withdrawn from the hole in the cuff, the cuff and the wheel with it can be rotated from one terminal position to the other by way of the cooperating bevelled gears. This results in the wheel cuff being driven between its two terminal angular positions by virtue of torque that is applied to the wheel still causing the wheel to rotate about its axle.

However, in this instance, instead of moving the automated guided vehicle, its mass ensures that the torque provided by the motor will alter the position of the wheel mechanism and will not affect the position of the automated guided vehicle itself. Thus, due to the difference in inertias between the wheel mechanisms and the automated guided vehicle whereby the combined inertias of the wheel mechanisms are far smaller than that of the automated guided vehicle. It is the differences in these inertias that results in the one mass to move significantly more than the other.

The wheels are free to roll around the arcuate groove and rotate the cuff with it. It should be noted that two wheels rotate in plan view in one direction and the other two in the opposite direction thereby resulting in a counter rotation relative to one another with the net resultant moment on the body of the automated guided vehicle being null.

The pins (21) are chamfered to help locate them and ensure accurate alignment of the cuff without the need for a complicated control system to verify the wheel axle position. In the alternative, an encoder may be placed on the collar of the wheel axle to provide positional feedback to both brake and motor control systems and thus allow for the specified angle of rotation to be accurately achieved.

Thus, when it is desired to change the direction in which the wheels are orientated, the solenoid operated pins are withdrawn and the wheel cuff is rotated so that the wheel follows the arcuate connecting grooves (6) from one guide groove (3) to a guide groove that crosses it. The pins can then be re-engaged and the wheels driven in the appropriate direction to move the automated guided vehicle in the desired direction without changing the orientation of the automated guided vehicle which therefore maintains its orientation relative to the modular racking.

Each automated guided vehicle has a large square aperture (25) in a central region thereof for receiving up to four storage boxes that can be positioned two on each side of an intermediate assembly of a rotatable shaft (26) and dividing beam (27). The dividing beam has guides in the form of two vertical transport rails (11) and cooperating vertical transport rails (11) on the opposing inside of the aperture. Thus up to four boxes can be supported as two pairs thereof, one pair on each side of the dividing beam, for transportation by the automated guided vehicle.

The rotatable shaft (26) that is driven by a gear motor forms the basis of a lifting device associated with the automated guided vehicle for moving boxes vertically into and out of the box receiving aperture by a distance in excess of the height of a box. This moves the boxes to or from the transfer layer in which the relevant automatic guided vehicle is operating and into or out of either of the upper or lower adjacent storage layers.

The lifting device in this embodiment of the invention comprises three parallel arms (31) fixed at one of their ends to the rotatable shaft (26) so as to be rotatable in unison with the rotatable shaft and having at their other ends transverse selectively retractable journals in the form of suitable bearings (32).

The retractable bearings are arranged for cooperation with horizontal lifting channels (33) in the sides of boxes wherein the parallel arms are arranged to be located along the sides of adjacent boxes. A low profile push solenoid moves the bearing between its terminal positions.

The lifting device is configured to move boxes vertically in relation to transport positions and storage positions both below and above the automated guided vehicle. This is achieved by confining the boxes to vertical movement due to interaction of the vertical rails and the boxes as will be further described below and the horizontal lifting channels of the boxes. Boxes to be moved are selected by machine-readable unique identification codes carried on the outer surface thereof as will be apparent from what follows and only the required journals are projected outwards at the free ends of the parallel lifting arms so that only a required box is engaged.

The movements therefore are that the retractable bearings are engaged with the lifting channels (33) towards one end thereof and move along the length of the lifting channels towards the other end thereof as the boxes are lifted or lowered. This may for example be achieved by rotating the arms through an angle of about 70 degrees from the origin. The aligned vertical rails fixed to the automated guided vehicle and to the horizontal support beams therefore serve as guides for confining boxes to substantially vertical movement relative to the automated guided vehicle and racking system.

Figure 20:
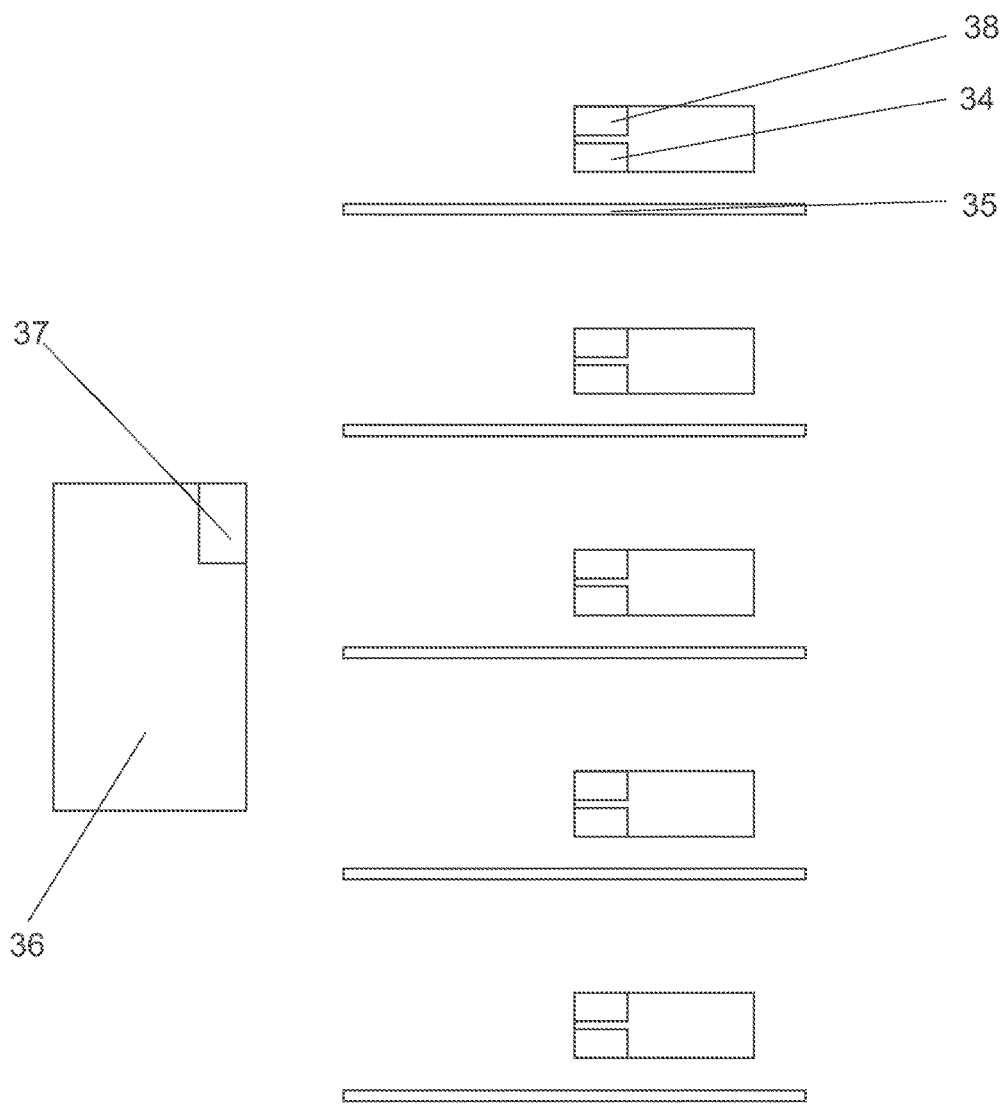
FIG. 20 is a block diagram of this particular environment of warehouse system.

The automated guided vehicle is fitted with one part of a contactless wireless energy transfer system as indicated by numeral (34) in FIG. 20 and the other part of which is associated with the co-operating racking system as indicated by numeral (35). The wireless energy transfer system could, for example, be of the type sold under the trade mark MOVITRANS® by the company SEW-EURODRIVE GmbH of Germany.

A computer based controller (36) (see FIG. 20) is provided for controlling movement of the automated guided vehicles in a horizontal plane and the operation of the lifting devices. Communication between the controller and each of the automated guided vehicles is preferably wireless by virtue of transmitter/receivers (37, 38) provided on the relevant apparatus. Clearly the programming of the computer will be aimed at achieving the most desirable result and the most efficient turnaround time for packages that are received for redistribution. Many different algorithms exist that can be used for such programming.

Turning now particularly to FIGS. 10 to 15, the box (7) is preferably made of an injection moulded nylon or other durable material with two sides (41) and two ends (42). The outer face of each side has a horizontal lifting channel (33) formed therein for engagement by a retractable bearing (32) carried by the lifting arms of an automated guided vehicle as described above. The horizontal lifting channels are preferably reinforced with steel or other durable material.

The ends (42) of the boxes have central vertical locating grooves (43) for receiving, in sliding relationship, vertical transport rails associated with an automated guided vehicle as described above or the vertical storage rails in respect of the storage positions. The box also has flat zones (44) (see FIG. 10) that are to receive machine readable identification labels unique to each box so that the identity of each box can be individually confirmed by an automated guided vehicle as may be required.

Each of the vertical locating grooves (43) has two vertically spaced spring loaded latching mechanisms (45) associated with them to interact with formations in the form of opposed cut out notches (46) in opposite surfaces of the vertical rails to support a box in position on the automated guided vehicle or in the storage positions.

Figures 14, 15:
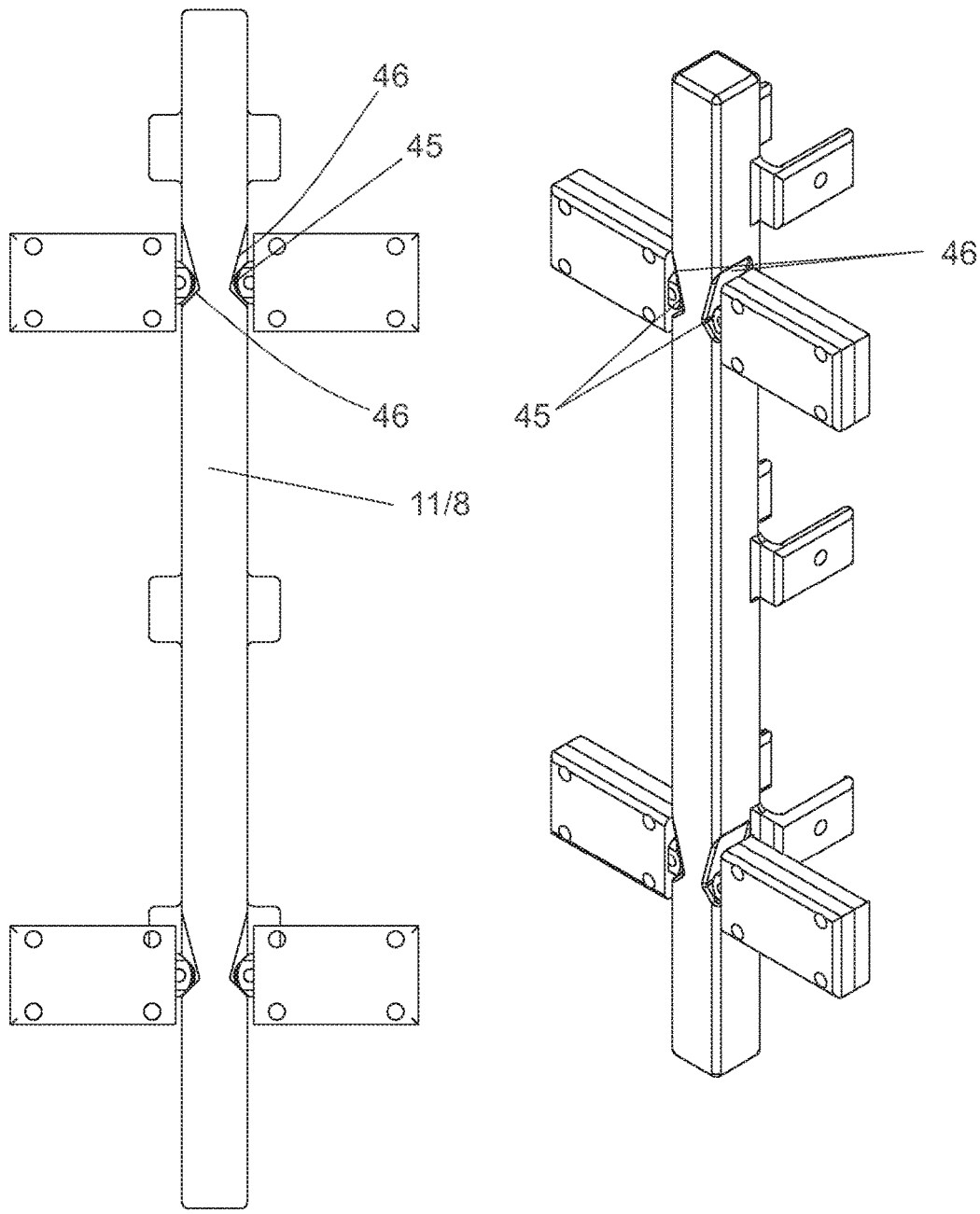
FIG. 14 is an elevation of a vertical rail of the type installed on an automated guided vehicle as illustrated in FIGS. 4 to 9 and a racking system showing its cooperation with spring-loaded catches fixed to the box in this embodiment of the invention.
FIG. 15 is an isometric view of the rail shown in FIG. 14.
Figure 16:
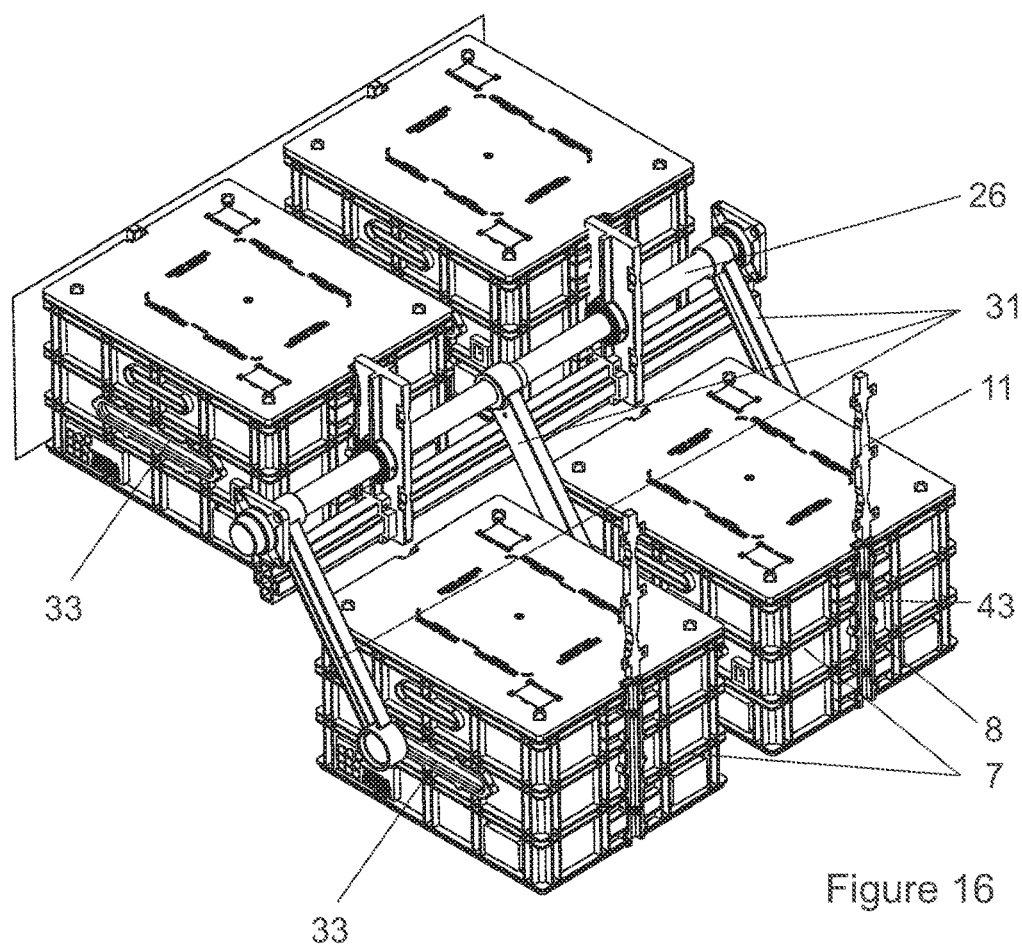
FIG. 16 it is an isometric view showing the lifting mechanism of an automated guided vehicle of the type illustrated in FIGS. 1 to 15 in operation.
Figure 17:
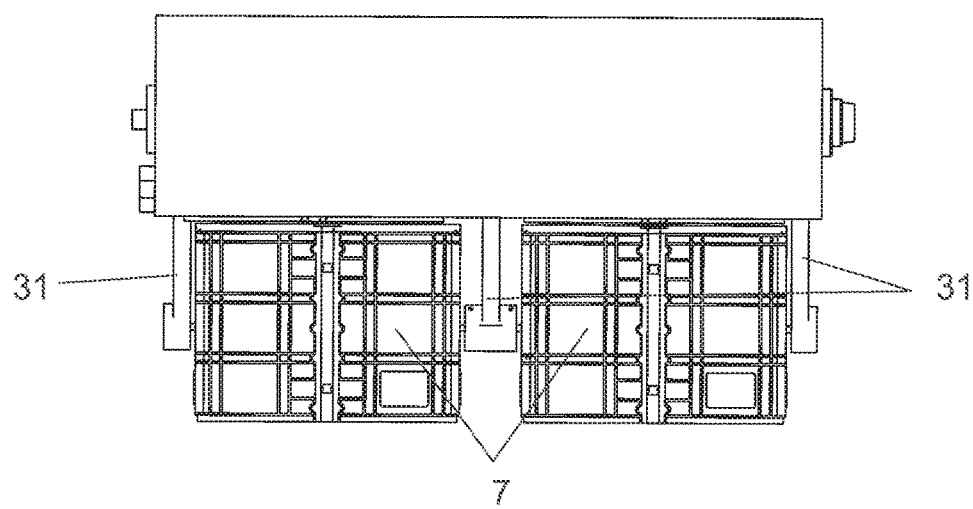
FIG. 17 is an elevation thereof.
Figure 18:
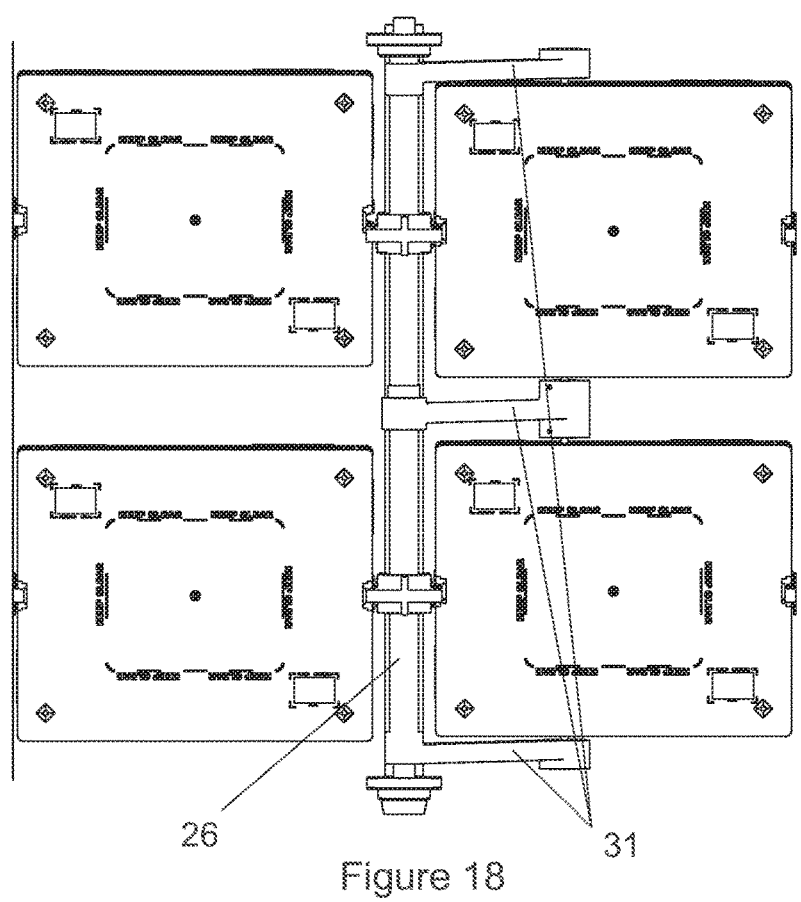
FIG. 18 is a plan view thereof.

As will be quite apparent from FIG. 14 in particular, the notches have two inclined faces meeting at their inner ends with the lower face inclined at a smaller angle to the horizontal than the upper face for purposes of ensuring that the boxes are adequately supported with the spring loading of the latching mechanisms being designed to accept a predetermined load, for example 20 kg. The tips of the latches are preferably bearings so that wear on the rails and notches is minimized.

The design of the lifting mechanism is made to overcome the resistance offered by such latching mechanisms.

Many products give off vapours and odours that can impact adversely on products in adjacent boxes and the customary way of combating this problem is to classify different products and store them in different storage areas.

The present invention offers an alternative to that strategy by providing a lid (47) for each box that has a peripheral seal for sealingly engaging the periphery of the open topped box. The lid has a central valve arrangement (49) for enabling the interior of the box to be evacuated, at least to some extent, to enhance sealing of the lid to the box and to thereby prevent odours or vapours from leaving a source box and preventing these or any other odours and vapours from entering a box and thus contacting the contents of a box. The valve arrangement is configured so that it opens only at a predetermined degree of the vacuum applied to it so that the lid can be initially handled by an automatic suction cup at a lower degree of vacuum and can also be evacuated using the same suction cup to evacuate the interior of the box consequent on increasing the suction pressure. The same valve may provide a facility for letting air back into the box in order to enable it to be opened.

In use, a racking system, fleet of automated guided vehicles and storage boxes of the type described above provide numerous advantages over existing systems.

The addition of a direction of movement of the automated guided vehicles in a second horizontal direction whilst substantially retaining the existing vertical functionality, automated guided vehicles are able to overtake, pass or assist one another in the simultaneous placement, relocation, sorting and retrieval of boxes. Because of the enhanced capacity of an automated guided vehicle, placement, sorting and retrieval of more than one, and in this instance up to four boxes can be carried out on one trip. As sorting is now an option, sorting and relocation for the purpose of optimizing the grouping of packages for ultimate dispatch, possibly to a common destination when a transport vehicle is available, is a major advantage.

The interface between the rails and a box allows for the box to move vertically upwards or downwards through the racking and the process of lifting or dropping a box down a level does not involve having to transport the box to the periphery of the racking system in order for a separate apparatus to lift or lower the box. If multiple automated guided vehicles are aligned vertically, a cascading effect may be created whereby boxes may be raised or lowered between storage or transport levels through the interior of the system.

It is to be noted that primary lifting of boxes or deliveries of packages can be done by conveyors that surround and pass through the racking matrix at certain intervals. Roller conveyors are preferred as they spin about their own axes and thus only the box with the package itself experiences a net movement upward. The automated guided vehicles of this invention may typically retrieve a package from above and deposit it below or vice versa. In that variation the process is gravity-fed, at least to some extent, thereby conserving energy and avoiding raising any equipment self-weight or boxes vertically.

It is to be noted that servo motors are capable of electronic braking. When the driving current to a servo motors is reversed, a braking torque is applied. If managed correctly, and only intermediate braking force is required, so-called regenerative braking can be achieved whereby the motors temporarily act as generators. Choosing electronic braking achieves energy regeneration, anti-locking nature of electric motors, no disc or drum wear, and weight saving since the motors already have to be present. Servo motors typically have an electromechanical braking system built in, especially for safety/redundancy in the case of loss of power. The present system could leverage both means of braking. In both instances, the braking takes place on the motor shaft and not the wheel shaft which would be very difficult to achieve given the size of the wheels. This locking-in-position could however be achieved with a friction type drum brake or any other appropriate mechanism.

An alternative that is contemplated in the invention are stepper motors which can be precisely controlled to speed up, slow down and stop at precise positions without over run and the need for other means of retardation and breaking.

Multiple racks can be joined both horizontally and vertically to create a large warehousing environment, as will be apparent from FIG. 19. The racking system is completely modular and may be comprised of multiples of single racks containing four or any other selected number of storage positions.

In normal use the automated guided vehicles themselves generally do not change levels as per existing systems of which applicant is aware unless a removal, re-distribution or deployment of automated guided vehicles is being carried out. Also, each box is never placed higher than is absolutely necessary because the storage is continuously defragmented creating the most compact stacking arrangement as close to the ground as possible. This ensures that inbound packages travel the shortest distance and are raised by the smallest distance.

It should be noted also that the sensors and other expensive mechanisms are found on the automated guided vehicles rather than in the racking system, as this decreases the number of necessary mechanisms. This in turn decreases the cost of the entire system and increases the usable space within the system.

Time and energy savings primarily result from the ability to continuously locate the most frequently accessed items as close as possible to the input or output of the system (namely a picking or placing employee). Due to the relative speed and ease with which the lifting mechanism may lift or lower a box through the racking system, boxes in higher storage positions that would typically be considered resource intensive to retrieve or place upon, may now be considered close by. In other words, in the past, bottlenecks may occur at lifts typically meant that quick access storage was confined to the base floor level.

It will be understood that numerous variations may be made to the embodiment of the invention described above without departing from the scope hereof. In particular the various mechanisms of the warehouse system described above can be varied widely and are not in any way limited to any specific examples given above. In particular, the drive of the automated guided vehicles can be varied widely and is not limited to the situation of wheels that can be turned through 90° to provide for the two different directions of travel at right angles to each other.

Thus, for example, the wheels can be of the type presently in use in the prior art in which two sets of wheels having their axes at right angles to each other in plan view may be used such that support of the automated guided vehicle is transferred from one set to the other set depending on the desired direction of travel.

Also, the way in which the cuff is prevented from moving when the wheels are being driven can be changed widely and could simply be controlled by a stepper motor or other electronic device or could be an alternative lock or even a suitable brake.

The supports need not assume the form of storage of transfer rails with the spring loaded latches as described above but could be any other releasable latching mechanism whereby the boxes can be supported in releasable manner in the automated guided vehicle or in the storage positions in the warehouse racking system. Such other mechanisms may use solenoid operated locking elements to support the weight of a box in both its storage and transport positions.

The lifting mechanism could also be varied widely and may be a pneumatic or hydraulic cylinder assembly of a suitable nature.

Alternatively, the lifting mechanism may include wheels or belts that can frictionally engage the sides of a box. Thus, as shown in the lower half of FIG. 21, elastomeric wheels (51) may engage in upright lifting grooves (52) in two opposite side walls of the box (53). The side walls of the lifting grooves (52) converge towards each other in a trapezoidal configuration in the manner of well-known V belts.

Figure 21:
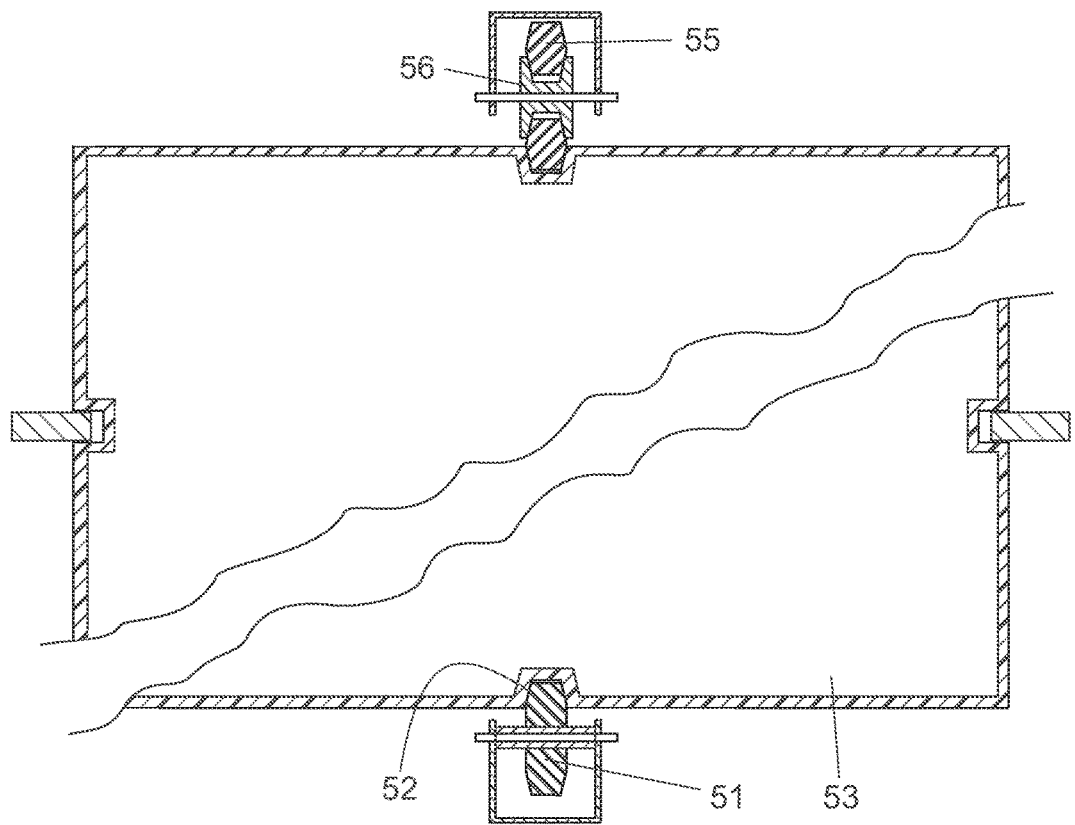
FIG. 21 is a sectional plan view of a box showing an alternative lifting device in which the upper half which shows a double V-belt arranged to lift boxes vertically relative to an automated guided vehicle whilst the lower half shows similarly configured driven pulleys having a V belt style periphery or engaging a groove in the outside wall of a box.

As shown in the upper half of FIG. 21, the frictionally engaging elements may, in the alternative, be a double sided V belt (55) running on cooperating pulleys (56).

Figure 22:
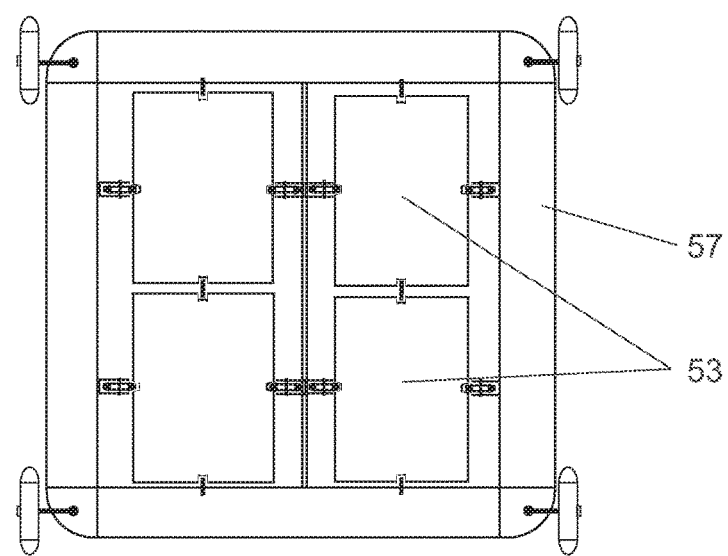
FIG. 22 is a schematic plan view of an automated guided vehicle for accommodating four of such boxes.

As shown in FIG. 22, eight of such arrangements could be employed on opposite sides of the four boxes (53), where the capacity is four boxes as described above.

Figure 23:
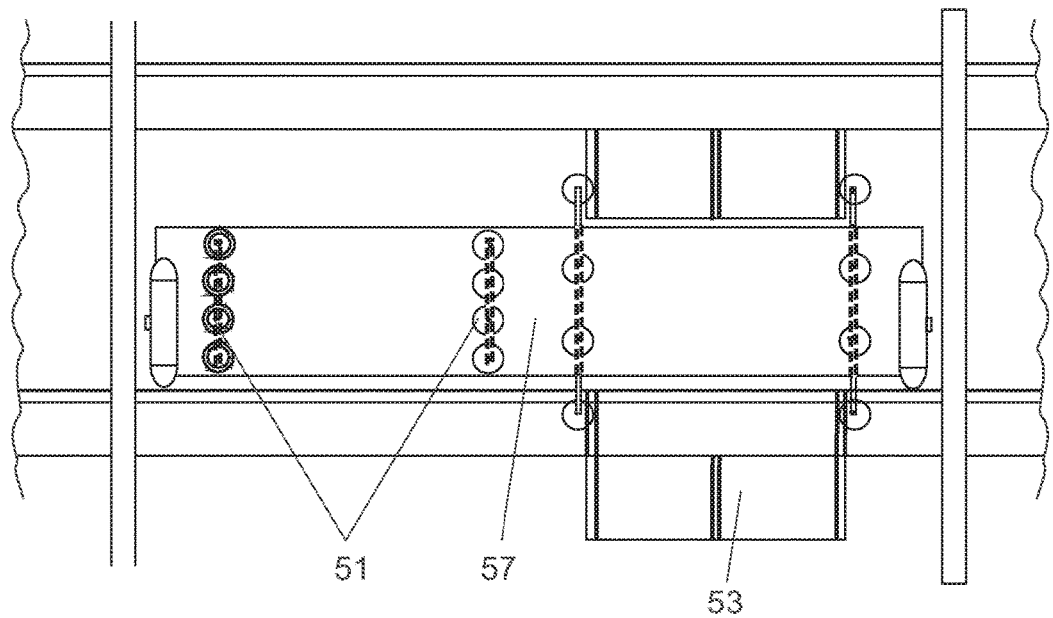
FIG. 23 is a side view of a portion of a part of a racking system utilising pulleys of the type illustrated in FIG. 21.

FIG. 23 shows retractable sets of four vertically elastomeric wheels (51) of this nature in the retracted condition on the left-hand side of the automated guided vehicle (57) and in a vertically extended condition on the right-hand side of the automated guided vehicle in which they can raise or lower a box (53) into, through or out of the automated guided vehicle.

Figures 24, 25:
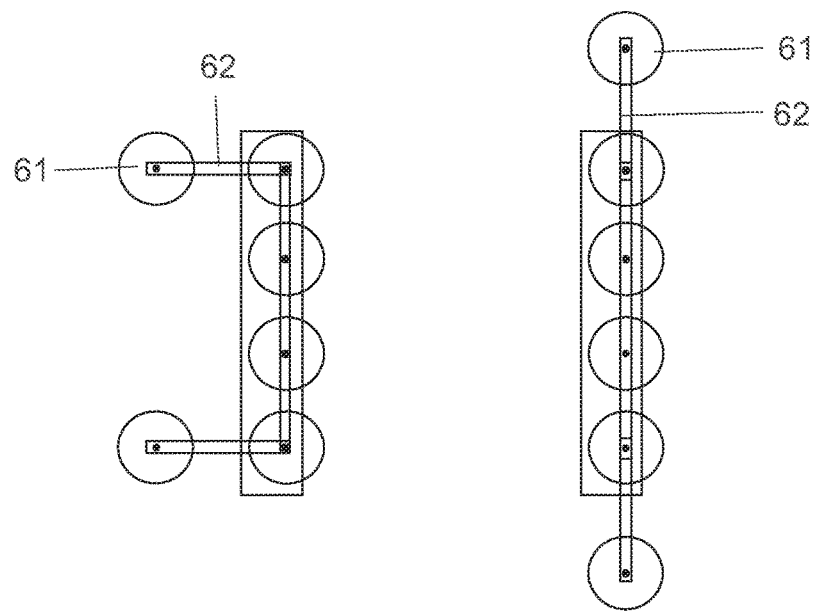
FIG. 24 is a schematic side view showing one array of pulleys in a retracted condition.
FIG. 25 is a schematic side view showing the array illustrated in FIG. 24 in an extended condition.

FIGS. 24 and 25 shows one way of retracting the uppermost and lowermost elastomeric wheels (61) are carried on arms (62) that can be rotated between a horizontal orientation as shown in FIG. 24 and a vertical orientation as shown in FIG. 25.

Figure 26:
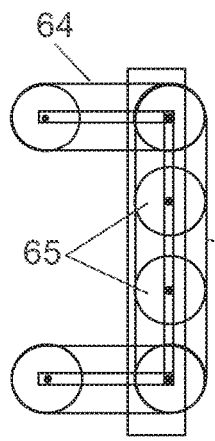
FIG. 26 is a schematic side view of one arrangement of pulleys and belts in a retracted condition.

FIG. 26 shows one arrangement of belts (63, 64) on pulleys (65) in which the operatively uppermost and lowermost pulleys are each connected to the adjacent pulley by a separate belt (64) so that they can be rotated from a horizontal orientation to a vertical orientation in the manner indicated above.

Figure 27:
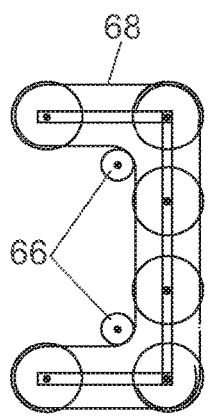
FIG. 27 is a schematic side in view of an alternative arrangement of pulleys and belts in a retracted condition.

FIG. 27, on the other hand, shows an arrangement of a single belt in which, in the retracted condition that is illustrated, idler pulleys (66) guide a single belt (68).

Figure 28:
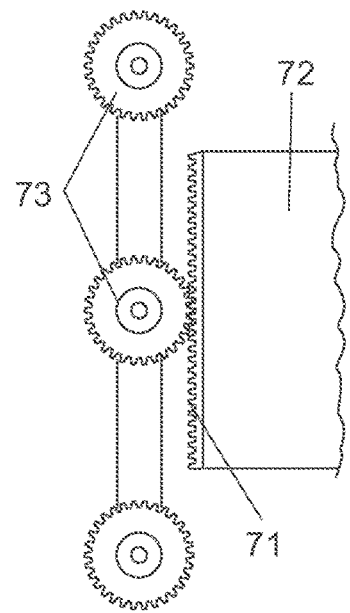
FIG. 28 is a schematic side view of an arrangement of a rack and pinion gears in an extended condition; and, FIG. 29 is a schematic plan view of one variation to the automated guided vehicle.

FIG. 28, illustrates a further variation of the invention in which a rack (71) is formed in a side of the box (72) and pinion gears (73) spaced apart and retractable as indicated above engaged in the rack releasably to move the box vertically as may be required.

Figure 29:
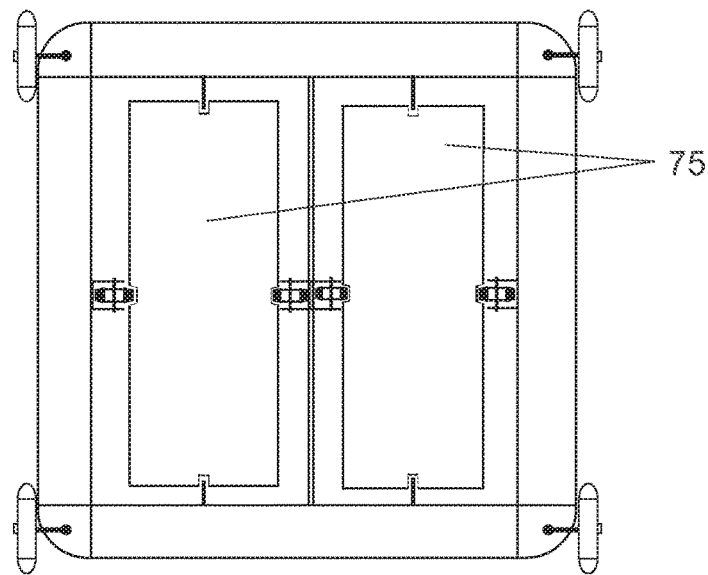

FIG. 29 illustrates, in plan view, one alternative arrangement of automated guided vehicle in which only two boxes (75) can be accommodated in a single vehicle. Obviously any other appropriate number can be used according to suitability of the racking system and the purpose that it is to serve.

The belted equivalent of this alternative may involve the use of a double sided toothed synchronous belt, commonly known as a timing belt with a cooperative castellated profile on a box.

Unlike other systems known to the applicant, variations of the invention allow for boxes to be passed directly from one automated guided vehicle to another automated guided vehicle with resulting improved efficient collaboration between automated guided vehicles. The organization and collaboration of these automated guided vehicles may be controlled by means of a wireless network and central supervisory computer which also allows for collaboration between the automated guided vehicles. The dynamic and optimal reorganization of boxes from their initial placement storage positions could be determined using modern programming techniques such as neural networks and by the application of evolutionary or genetic algorithms.

In some embodiments of the invention the lifting mechanism of the automated guided vehicle allows for near continuous motion in the lifting and lowering of boxes which, when coordinated with automated guided vehicles at adjacent levels, results in not having to rely only on any separate lifting infrastructure. This allows for incremental scalability by the addition of modules of racking unconstrained by the need for further infrastructure.

Implementation of the invention also does not require high tolerance concrete floors required by forklift operations, or floor based automated guided vehicles wherein the stability determines the height limitation of racking systems. The three dimensional lattice structure of the invention allows for higher stability and a more economical structure when compared to tall shelving systems. As a result, existing spaces and warehouses can be retrofitted with greater degrees of freedom than purpose designed warehouses with strict floor tolerances and highly technical floor design and high quality construction.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A racking system in which multiple storage positions are provided for individual storage boxes and automated guided vehicles are present to carry out automated placement, relocation and retrieval of boxes from storage positions in which they are located, the racking system being arranged in:
   horizontally extending layers comprising:
   storage layers in which said multiple storage positions are located; and
   transfer layers vertically juxtaposed with respect to the storage layers so that the storage layers and transfer layers alternate;
   wherein automated guided vehicles are movable in at least two directions at right angles to each other in the transfer layers to place, relocate and retrieve boxes to and from storage positions in which they are located in the storage layers by vertical movement of the boxes into and out of storage positions in which a storage box is located above or below a transfer layer,
   wherein storage guides for guiding boxes into and out of the storage positions are associated with the storage positions,
   wherein support arrangements for supporting the boxes in their storage positions are associated with the storage positions, and
   wherein a box stored in a storage position in one storage layer positioned between two transfer layers is accessible by both an automated guided vehicle movable in a transfer layer above that storage layer as well as by an automated guided vehicle movable in a transfer layer below that storage layer such that a box stored in the one storage layer can be transferred from that storage layer through an automated guided vehicle to another storage layer and thence directly to an automated guided vehicle in a different transfer layer to effectively and continuously move the box vertically upwards or downwards through the racking system.

2. The racking system as claimed in claim 1, wherein the storage guides are vertical rails arranged to align with vertical rails provided on automated guided vehicles temporarily so that a box can be guided for movement between an automated guided vehicle and a storage position by moving a box along temporarily aligned rails.

3. The racking system as claimed in claim 1, comprising:
   multiple horizontal support beams, and
   multiple vertical supports that support the horizontal support beams with the horizontal support beams extending between the vertical supports,
   wherein the width of the horizontal support beams project outwards beyond the dimensions of the vertical supports in plan view so that automated guided vehicles can pass the vertical supports and each other, and
   wherein the multiple horizontal support beams define distinct tracks or rails along which the automated guided vehicles are movable.

4. An automated guided vehicle for use in association with the racking system as claimed in claim 1, the automated guided vehicle comprising:
   a support wheel assembly;
   a drive arrangement for the support wheel assembly enabling the automated guided vehicle to travel selectively in at least two horizontal directions at right angles to each other and parallel to sides of the automated guided vehicle, wherein the automated guided vehicle is of a generally square outer peripheral shape in plan view and has a box receiving aperture in a central region thereof for receiving at least one box to be transported by the automated guided vehicle moved vertically into or out of the aperture in either an upwards or a downwards direction relative to the support wheel assembly;

supports for at least intermittently supporting at least one storage box located within the box receiving aperture;

guides for guiding a box into and out of the box receiving aperture in a vertical direction;

a lifting device associated with the automated guided vehicle for moving a box vertically into and out of the box receiving aperture by a distance in excess of a height of the box and to enable boxes to be passed vertically directly from one automated guided vehicle to another automated guided vehicle; and a controller for controlling movement of the automated guided vehicle in a horizontal plane and for controlling operation of the lifting device.

5. The automated guided vehicle as claimed in claim 4 wherein a transmitter and receiver are provided for two-way communication between the automated guided vehicle and a centralized control computer for controlling multiple automated guided vehicles and for transmitting and receiving locational data of automated guided vehicles and boxes.

6. The automated guided vehicle as claimed in claim 4 wherein the box receiving aperture is dimensioned to receive four juxtaposed boxes each of generally rectangular shape in plan view.

7. The automated guided vehicle as claimed in claim 4 wherein the lifting device is configured to move boxes vertically in relation to storage positions both below and above the automated guided vehicle and the supports are vertical rails fixed to the automated guided vehicle and serving as guides for confining boxes to substantially vertical movement relative to the automated guided vehicle, the vertical rails having formations for cooperation with co-operant formations on a box.

8. The automated guided vehicle as claimed in claim 4 wherein the lifting device comprises parallel arms rotatable in unison about one of their ends and having at the other ends retractable journals for cooperating with horizontal lifting channels in the sides of boxes wherein the parallel arms are arranged to be located along the sides of adjacent boxes, in use.

9. The automated guided vehicle as claimed in claim 4 wherein the lifting device comprises sets of opposite and inwardly directed wheels with or without belts on each side of each box receiving aperture of the automated guided vehicle such that the wheels or belts face inwards towards the box receiving aperture and are releasably engageable with opposite sides of a box present in the aperture.

10. The automated guided vehicle as claimed in claim 4 wherein vertical rails have formations for cooperation with co-operant formations on a box in order to support it in its operative position.

11. The automated guided vehicle as claimed in claim 4 wherein the support wheel assembly includes:

four wheels generally at the corners of the generally square automated guided vehicle, wherein each wheel is rotatable about its own horizontal axis and is mounted on a cuff;

wherein the cuff is rotatable about a vertical axis with a drive assembly;

wherein the drive assembly includes a motor configured to selectively drive the cuff from one terminal position through 90° to a second terminal position so that the automated guided vehicle can travel in a direction at right angles to the corresponding first terminal position without changing its orientation.

12. The automated guided vehicle as claimed in claim 11 wherein the drive assembly includes cooperating beveled gears connected to a motor drive so as to be capable of driving the wheel cuff between its two terminal positions when a releasable lock or brake is disengaged and of driving the wheel itself when the releasable lock or brake is engaged.

13. A box for use in association with the racking system as claimed in claim 1, the box comprising:

two sides; and two ends, wherein outer faces of two opposite sides or two opposite ends have horizontal lifting channels formed therein for engagement by retractable journals carried by lifting arms of an automated guided vehicle, or wherein said outer faces have vertical surfaces or formations selected from vertical flat friction surfaces, an integral vertical rack formation and truncated V-shaped grooves for engagement by wheels or belts forming a lifting device.

14. The box as claimed in claim 13 wherein the ends or sides of the box comprise:

vertical locating grooves for receiving, in sliding relationship, vertical rails associated with an automated guided vehicle as defined in claim 4, wherein the vertical locating grooves have latching mechanisms associated with them to interact with formations in vertical rails to support a box in position on the automated guided vehicle.

15. The box as claimed in claim 13, wherein the box is provided with a lid having a seal for sealingly engaging the periphery of an open topped box, wherein the lid has a valve arrangement for enabling the interior of the box to be evacuated, at least to some extent, to enhance sealing of the lid to the box.

* * * * *